(No Model.)

T. J. MAGRUDER.
HARNESS.

No. 467,037. Patented Jan. 12, 1892.

WITNESSES:
H. Walker
C. Sedgwick

INVENTOR:
T. J. Magruder
BY Munn & Co
ATTORNEYS

UNITED STATES PATENT OFFICE.

THOMAS J. MAGRUDER, OF MARION, OHIO.

HARNESS.

SPECIFICATION forming part of Letters Patent No. 467,037, dated January 12, 1892.

Application filed July 14, 1891. Serial No. 399,480. (No model.)

*To all whom it may concern:*

Be it known that I, THOMAS J. MAGRUDER, of Marion, in the county of Marion and State of Ohio, have invented a new and useful Improvement in Strap-Attaching Devices for Harnesses, of which the following is a full, clear, and exact description.

My invention has for its object to provide a device whereby various portions of a harness may be quickly, conveniently, and economically connected and whereby when the device is used as a connecting medium for a harness the straps of the harness at their points of connection will be effectually prevented from being worn or chafed.

The invention consists in the particular construction and arrangement of parts, as will be hereinafter fully set forth, and pointed out in the claim.

Reference is to be had to the accompanying drawings, forming a part of this specification, in which similar figures and letters of reference indicate corresponding parts in all the views.

Figure 1:
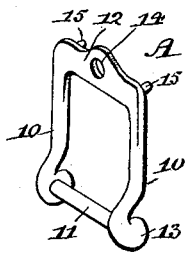
Figure 2:
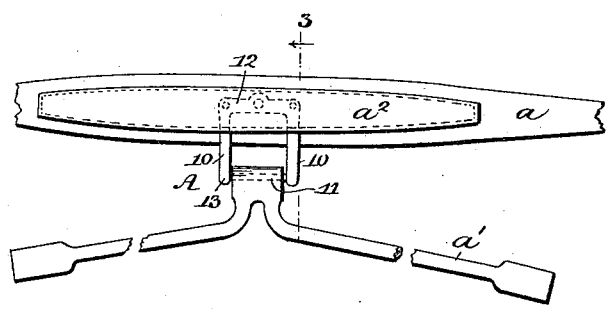
Figure 3:
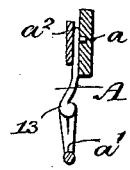
Figure 4:
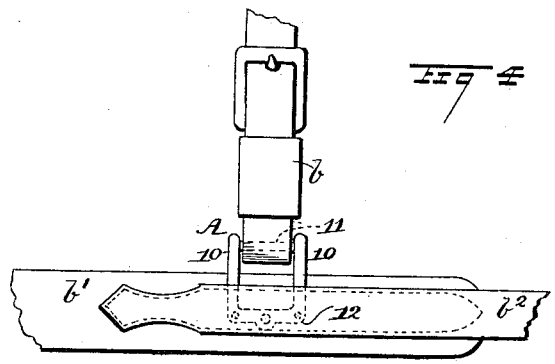

Figure 1 is a perspective view of the device. Fig. 2 illustrates the application of the device to unite a brow and winker strap. Fig. 3 is a vertical section taken on the line 3 3 of Fig. 2, and Fig. 4 illustrates the application of the device in uniting the breast-collar and trace with the neck-strap.

The device A is in the shape of a skeleton frame comprising two side pieces 10 an end-connecting-rod 11, circular in cross-section, and an opposite end cross-bar 12, preferably made flat. The side pieces 10 are preferably made approximately round in cross-section, and the ends connected by the bar 11 are curved upward and thence downward and are made to terminate in disks 13, in effect the ends of the side pieces 10 connected by the rod 11, having a scroll formation, and as the rod 11 at its ends is located at about the center of the disks 13 the upper side edge of the frame is considerably above the rod and the lower side edge is likewise removed some distance from the rod.

At or about the center of the cross-bar 12 an opening 14 is produced, and upon the under side of said cross-bar, at or near its ends, or upon the side pieces 10, near their junction with the cross-bar, spurs 15 are formed.

In Figs. 2 and 3 the device is shown as uniting the brow-strap $a$ of the harness with the winker-strap $a'$. In accomplishing this result the cross-bar 12 is placed upon the brow-strap and a rivet is passed through its opening 14, the spurs 15 being driven in the strap. The ordinary upper strap-layer $a^2$ is then placed over the cross-bar and secured to the brow-strap proper. It will be observed that this fastening of the device to the brow-strap is perfect and secure and that no strain whatever is exerted upon the upper layer-strap $a^2$. The winker-strap is formed with an eye at its center, through which eye the rod 11 of the device passes, and the winker-strap is free to turn upon the rod.

Owing to the projection of the side pieces of the device beyond the faces of the rod 11, the eye of the winker-strap cannot be worn or chafed by outside influences, as any article calculated to wear it would necessarily engage with the projecting end portions of the device, and thus be prevented from being brought in contact with the eye of the winker-strap. This arrangement of the device is also shown in Fig. 4, in which a neck-strap $b$ is shown connected with a breast and collar strap $b'$, the cross-bar 12 of the device being secured to the breast-collar strap $b'$ and the neck-strap $b$ to the rod 11 of the device, the inner end of the trace $b^2$ constituting the cover or layer strap. The attachment of the neck-strap to the collar-strap is an important one, as a maximum of wear is upon the eye of the latter strap; but the device effectually protects the eye from wear through the medium of the disks 13.

The device is exceedingly simple, durable, and economical, and is capable of convenient and expeditious application to any harness.

Having thus described my invention, what I claim, and desire to secure by Letters Patent, is—

A device for connecting the parts of a harness, consisting in the device A, formed of the side bars 10, having the disk-like enlargements 13 at one end, the end bar 11, secured to the center of the said disks, and the end bar 12, provided with the aperture 14 and the spurs 15, substantially as herein shown and described.

THOMAS J. MAGRUDER.

Witnesses:
JNO. M. BRIGEL, Jr.,
WM. H. KINSLER.